United States Patent [19]

Zieg

[11] 4,059,519
[45] Nov. 22, 1977

[54] PUMP BASKET STRAINER AND ASSEMBLY

[75] Inventor: Steven A. Zieg, Yorba Linda, Calif.

[73] Assignee: Purex Corporation, Lakewood, Calif.

[21] Appl. No.: 645,086

[22] Filed: Dec. 29, 1975

[51] Int. Cl.² .................................................. E04H 3/20
[52] U.S. Cl. ................................... 210/169; 210/451; 210/470; 210/474
[58] Field of Search ............... 210/451, 452, 455, 470, 210/473, 474, 477, 479, 435, 443, 169, 150, 497–499; 55/495, 501, 505, 511, 498, 525, 527

[56] References Cited

U.S. PATENT DOCUMENTS

| | | | |
|---|---|---|---|
| 1,152,831 | 9/1915 | Monteagle | 210/443 |
| 1,874,410 | 8/1932 | Andrews | 210/470 |
| 2,459,534 | 1/1949 | Kennedy | 210/452 X |
| 2,915,188 | 12/1959 | Buker | 210/452 X |
| 3,365,064 | 1/1968 | Horan, Jr. | 210/169 |
| 3,473,701 | 10/1969 | Bates | 210/474 X |
| 3,542,201 | 11/1970 | Belonger et al. | 210/169 |
| 3,616,916 | 11/1971 | Greene | 210/169 X |
| 3,631,981 | 1/1972 | Young | 210/497 X |
| 3,794,164 | 2/1974 | Ginaven | 210/499 X |
| 3,909,415 | 9/1975 | Young | 210/169 X |

Primary Examiner—Frank W. Lutter
Assistant Examiner—Richard L. Chiesa
Attorney, Agent, or Firm—William W. Haefliger

[57] ABSTRACT

An upright strainer basket for reception in a housing primary chamber having an upper fluid inlet port and a lower fluid outlet port. The basket has:

a. exteriorly presented ribs that intersect to form perforations to pass fluid from the basket interior to the primary chamber outlet port, b. the basket having a side inlet located to register with the primary chamber inlet port, c. and said basket having a support flange extending above said side inlet to define a handle adapted to be grasped from the basket interior to remove the basket upwardly from the primary chamber.

7 Claims, 8 Drawing Figures

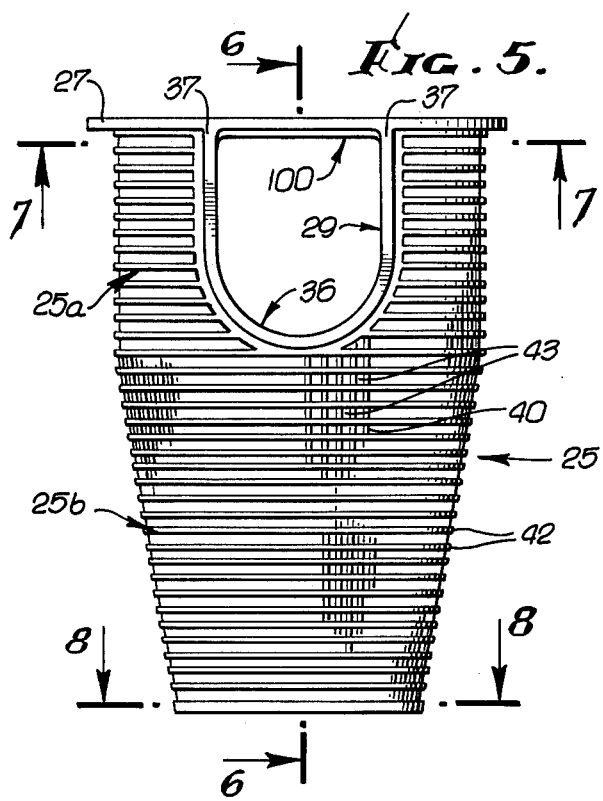
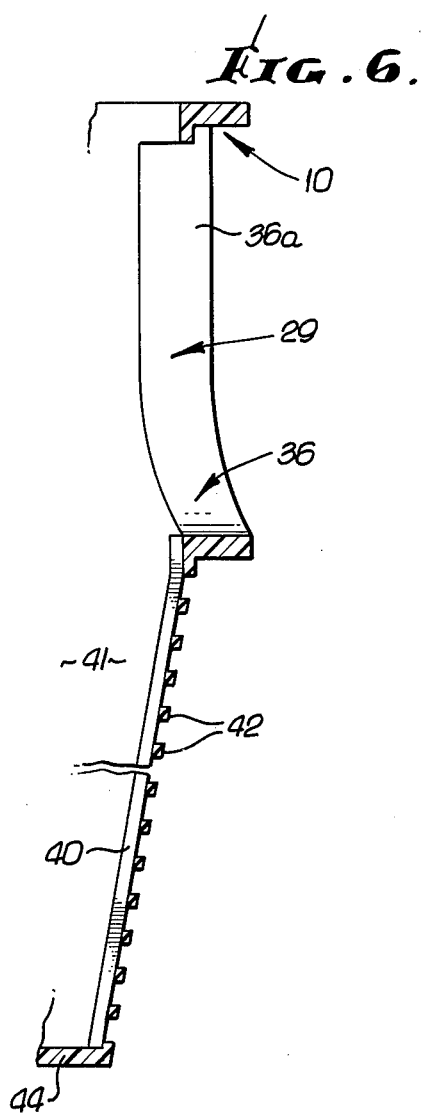
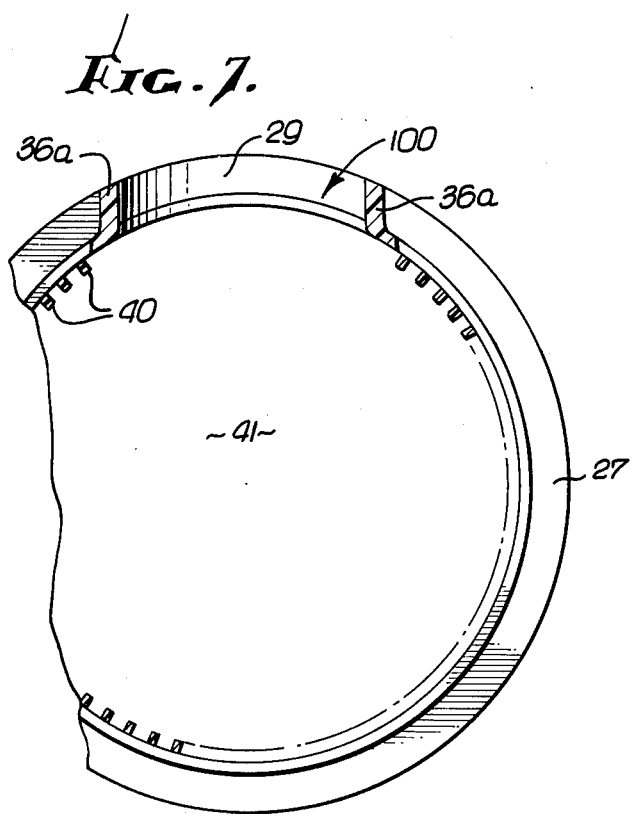
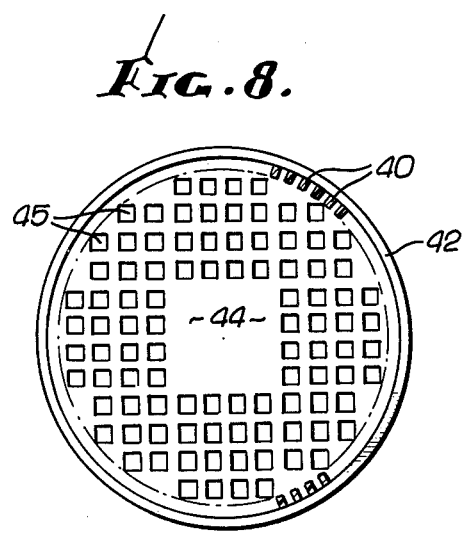

PUMP BASKET STRAINER AND ASSEMBLY

BACKGROUND OF THE INVENTION

This invention relates generally to the straining of debris from fluid or water, and more particularly concerns a strainer basket operable in a pump volute and strainer housing to remove debris from swimming pool water.

Prior swimming pool strainer pots suffered from certain disadvantages in construction, mounting and functioning. For example, they were generally located to receive debris and water via and into their open upper ends, creating excessive dead space above such pots, which became filled with debris. Such floating debris could spill into the housing chamber when the pot was removed for cleaning, creating risk of clogging filter lines. Also, pivoted handles on prior pots extended above the upper interior of the pots, preventing reduction of such dead space. Further, prior assemblies were bulky and otherwise disadvantageous in design.

SUMMARY OF THE INVENTION

It is a major object of the invention to provide a filter basket and pump volute housing obviating the above disadvantages and problems. Basically, the assembly comprises:

a. a housing forming a downwardly tapering primary chamber having an upper level fluid inlet port and a lower level fluid outlet port, said ports located at opposite sides of the chamber, the housing having an internal support ledge, and b. a fluid strainer basket received downwardly in said chamber and supported on said ledge, the basket having a side inlet in registration with said primary chamber inlet port, the basket having exteriorly and interiorly presented ribs that intersect to form perforations to pass fluid from the basket interior to said primary chamber outlet port.

As will be seen the internal support ledge may be located above the level of the primary chamber inlet port to support a basket external flange, the ledge extending about but being interrupted by an upward extension of the primary chamber inlet port. Further, the basket flange typically extends over the basket side inlet to define an integral handle by which the basket may be grasped and removed for cleaning when a lid on the housing is removed. Dead space above the basket and below the lid may thereby be minimized, obviating the problems previously referred to.

Other objects include the provision of basket vertical interior ribs facilitating cleaning, and exterior horizontal ribs aiding exterior flow around the basket toward the outlet, the ribs intersecting to form basket side perforations.

These and other objects and advantages of the invention as well as the details of an illustrative embodiment, will be more fully understood from the following description and drawings, in which:

DRAWING DESCRIPTION

FIG. 1 is a perspective view of the assembly;
FIG. 2 is a vertical section or on lines 2—2 of FIG. 1;
FIG. 3 is a plan view taken in section on lines 3—3 of FIG. 2;
FIG. 4 is a fragmentary vertical section on lines 4—4 of FIG. 3;
FIG. 5 is a side elevation of the strainer basket;
FIG. 6 is an enlarged fragmentary vertical section on lines 6—6 of FIG. 5;
FIG. 7 is an enlarged fragmentary plan view on lines 7—7 of FIG. 5, and
FIG. 8 is a plan view on lines 8—8 of FIG. 5.

DETAILED DESCRIPTION

Figure 1:
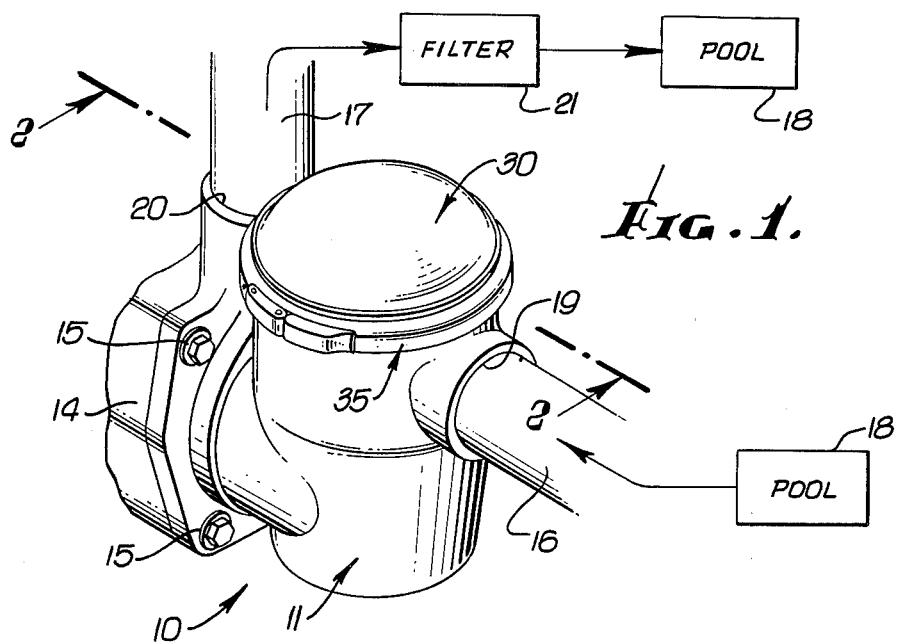
Figure 2:
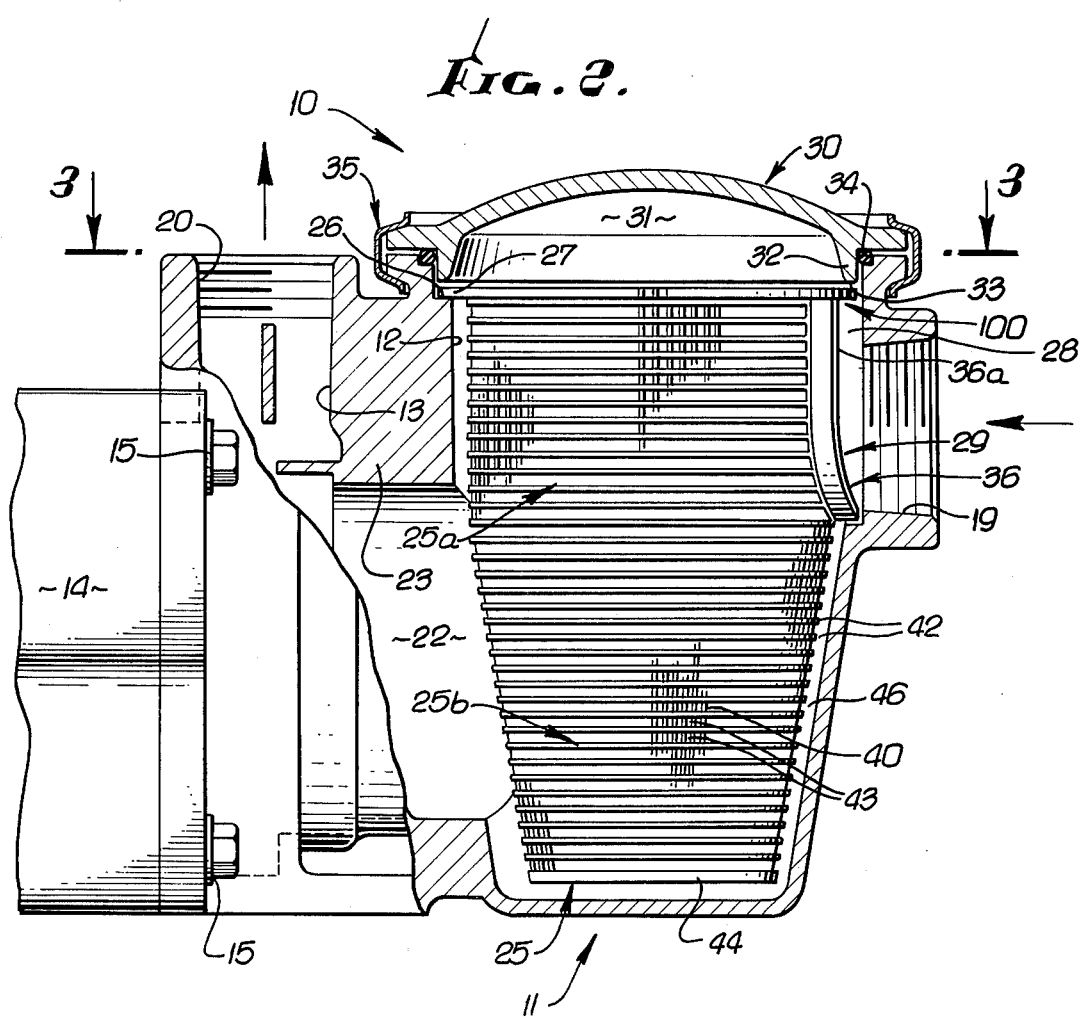
Figure 3:
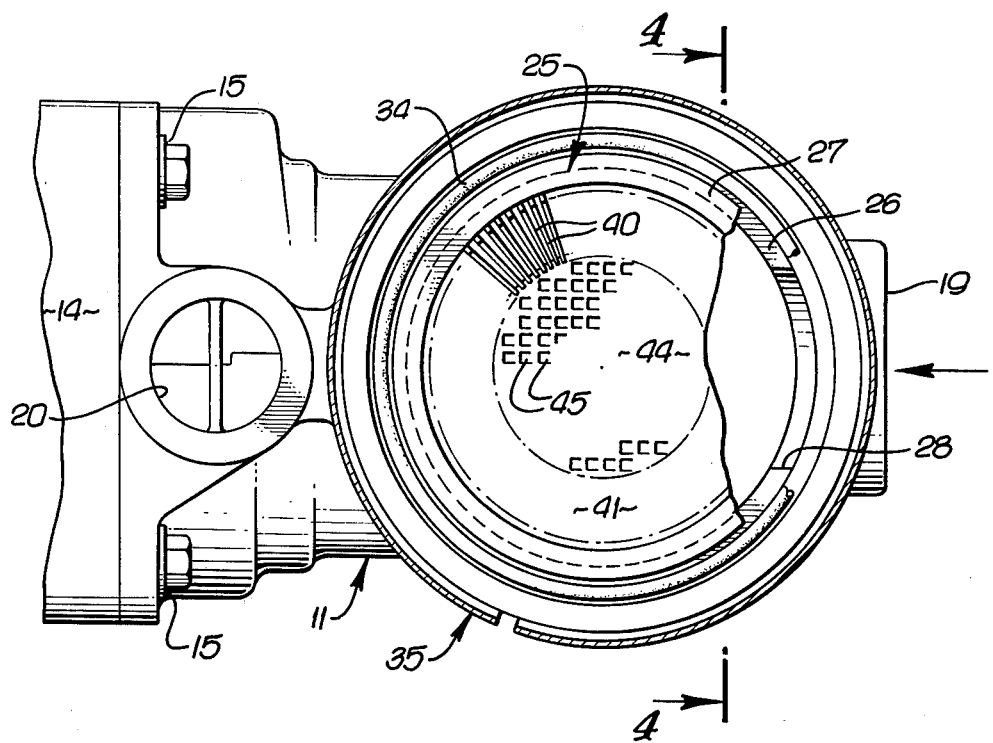

In the drawings, the assembly 10 includes a housing 11 defining a primary chamber 12 and a pump volute chamber 13. The pump motor 14 may be bolted to the housing 11 as at 15 to locate a pump rotor in volute chamber 13. Lines 16 and 17 respectively deliver water from the swimming pool 18 to the primary chamber upper level fluid inlet 19, and return water from the volute chamber discharge outlet 20 to the pool. An auxiliary filter 21 may be employed in line 17.

The primary chamber 12 also has a lower level fluid outlet port 22 formed in upright partition 23 that separates chambers 12 and 13. Inlet 19 and outlet 22 are shown as located at opposite sides of the primary chamber 12.

Figure 4:
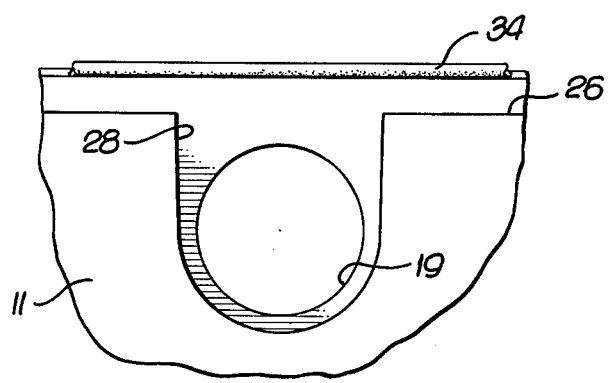

In accordance with an important aspect of the invention, a fluid strainer basket 25 is received downwardly in the chamber 12. Typically, the basket has an upper cylindrical portion 25a, and a lower downwardly tapered portion 25B which is presented toward outlet 22. Further, the housing has an internal, upwardly presented support ledge 26 located above the level of the primary chamber inlet port 19, and the basket is removably suspended on ledge as via a basket external flange 27. As is clear from FIG. 4, ledge 26 extends about the basket, but is interrupted by an upward extension of the inlet port 19, that extension forming a vertical slot 28 at inner side of port 19.

The basket has a side inlet 29 in direct registration with the chamber side inlet port 19; further, the basket rim or flange 27 extends circularly and over the side inlet 29, so as to form a handle 100 adapted to be grasped via the basket upper interior, to remove the basket from the primary chamber when lid 30 is upwardly removed. Accordingly, no auxiliary basket handle is needed, and space 31 between the lid and basket may have minimum vertical dimensioning. This allows for compact packaging of the assembly, and also prevents build up of debris in the space above the basket, as debris enters the basket from the side, not the top, of the basket. Further, debris will not be floating above the basket when the lid is removed, so the spillage of the debris into the primary chamber 12, is prevented when the basket is removed. Therefore, multiple structural and functional advantages are realized.

Note that the lid 30 has a skirt 32 defining a downwardly presented shoulder 33 acting to retain the basket flange directly above the support ledge. An O-ring 34 seals off between the lid and housing, and a releasable clamp ring 35 straddles flanges on the lid and housing to hold the lid to the housing, as shown.

The basket also forms a sidewardly projecting boss 36 extending about the basket side inlet and upwardly at 36a to meet flange 27 at locations 37. The boss 36 is received downwardly in the upper extension of the inlet port 19, i.e. in slot 28.

It will further be noted that basket interiorly presented and projecting ribs 40 are circularly spaced about the basket interior 41. Ease of manual cleaning is thereby facilitated, as debris may be swept out of the basket in the direction of ribs 40. Basket exteriorly presented ribs 42 are vertically spaced and extend generally horizontally about the basket. These two sets of ribs intersect to form perforations 43 through which fluid or water passes from the basket interior to the exterior. Bottom wall 44 is also perforated at 45. Flow passing clearance is formed at 46 between the exterior ribs 42 and inner wall of the primary chamber and ribs 42 promote or channel horizontal flow of water around the basket and toward outlet 22, in generally uniform flow patterns.

Finally, the housing lid 30, shoulder 33 and clamp ring 35 provide a rugged assembly to hold the strainer basket in down position. This prevents rising of the basket from its seal and by-passing of water around the basket. Prior hold down devices tended to wear out and break, allowing considerable water by-passing around the basket.

I claim:

1. In a pump volute housing and strainer assembly,
   a. a housing forming a downwardly extending primary chamber having an upper level fluid inlet port and a lower level fluid outlet port, said ports located at opposite sides of the chamber, the housing having an internal support ledge, and
   b. a fluid strainer basket received downwardly in said chamber and supported on said ledge, the basket having a side inlet in registration with said primary chamber inlet port, the basket having exteriorly and interiorly presented ribs that intersect to form perforations to pass fluid from the basket interior to said primary chamber outlet port,
   c. said internal support ledge being located above the level of said primary chamber inlet port, the ledge extending about the basket but being interrupted by an upward extension of said primary chamber inlet port, the basket having an external flange engaging said ledge, the flange extending generally circularly over the basket side inlet to thereby define a handle adapted to be grasped from the basket upper interior to remove the basket upwardly from the primary chamber, the basket and housing having generally vertically extending guide means proximate said inlet port and cooperating to locate the handle generally above said inlet port when the basket is received downwardly into said chamber.

2. The assembly of claim 1 wherein the housing forms a pump volute chamber at the side of said outlet port opposite the primary chamber.

3. The assembly of claim 1 including a removable lid on the housing and having a downwardly presented shoulder retaining the basket flange directly above said support ledge.

4. The assembly of claim 1 wherein the guide means is defined by a basket sidewardly projecting boss extending about the basket side inlet and upwardly to meet said flange, the boss received downwardly in said upward extension of the primary chamber inlet port.

5. The combination of claim 4 including water lines connected with said housing inlet and the discharge from the volute chamber to pass swimming pool water to the housing and to return said water to the pool.

6. The assembly of claim 1 wherein the interiorly presented ribs extend vertically, are circularly spaced about the basket interior, and project inwardly beyond the inner sides of the exteriorly presented ribs.

7. The assembly of claim 6 wherein the exteriorly presented ribs are vertically spaced, extend generally horizontally about the basket, and project outwardly beyond the outer sides of the interiorly presented ribs.

* * * * *